(12) United States Patent
Mildner

(10) Patent No.: US 8,246,105 B2
(45) Date of Patent: Aug. 21, 2012

(54) FRONTAL STRUCTURE FOR A MOTOR VEHICLE

(75) Inventor: Udo Mildner, Limburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/968,121

(22) Filed: Dec. 14, 2010

(65) Prior Publication Data

US 2011/0140464 A1    Jun. 16, 2011

(30) Foreign Application Priority Data

Dec. 14, 2009    (DE) .................. 10 2009 058 275

(51) Int. Cl.
*B60K 11/04*    (2006.01)

(52) U.S. Cl. .............. 296/187.09; 296/203.02; 293/115; 280/784; 180/274; 180/68.6

(58) Field of Classification Search ............ 296/187.09, 296/203.02, 193.1, 187.02; 293/115, 117; 280/784; 180/274, 68.6, 68.4
See application file for complete search history.

(56) References Cited

U.S. PATENT DOCUMENTS

| | | | |
|---|---|---|---|
| 6,364,403 B1 * | 4/2002 | Ozawa et al. | ........... 296/187.09 |
| 2001/0001994 A1 | 5/2001 | Enomoto et al. | |
| 2008/0272608 A1 | 11/2008 | Schmahl | |
| 2009/0266634 A1 | 10/2009 | Obayashi et al. | |
| 2010/0078149 A1 | 4/2010 | Yoshimitsu et al. | |

FOREIGN PATENT DOCUMENTS

| | | |
|---|---|---|
| DE | 10161432 A1 | 7/2003 |
| DE | 102004024151 A1 | 1/2005 |
| DE | 102006061806 A1 | 7/2008 |
| DE | 102007020914 A1 | 11/2008 |
| DE | 102008051394 A1 | 5/2010 |
| EP | 2080690 A1 | 7/2009 |
| JP | 2006256461 A | 9/2006 |
| JP | 2009234303 A | 10/2009 |

OTHER PUBLICATIONS

German Patent Office, German Search Report for Application No. 102009058275.4, dated Nov. 23, 2010.

* cited by examiner

*Primary Examiner* — Joseph Pape
(74) *Attorney, Agent, or Firm* — Ingrassia Fisher & Lorenz, P.C.

(57) ABSTRACT

A frontal structure is provided for a motor vehicle that includes, but is not limited to a support structure that can be connected to longitudinal members of a front frame, to which a cooling module is fastened with a retaining device, and a bumper cross member mounted ahead of the cooling module. The retaining device includes, but is not limited to at least two cooling module holders that are attached to a component selected from support structure and cooling module and which are provided with elongate recesses, in which retaining elements attached to the respectively other component are anchored. The retaining device is configured in such a manner that in the event of a backward yielding of the bumper cross member, a translational displacement of the cooling module in the direction opposite to the direction of travel is possible.

20 Claims, 5 Drawing Sheets

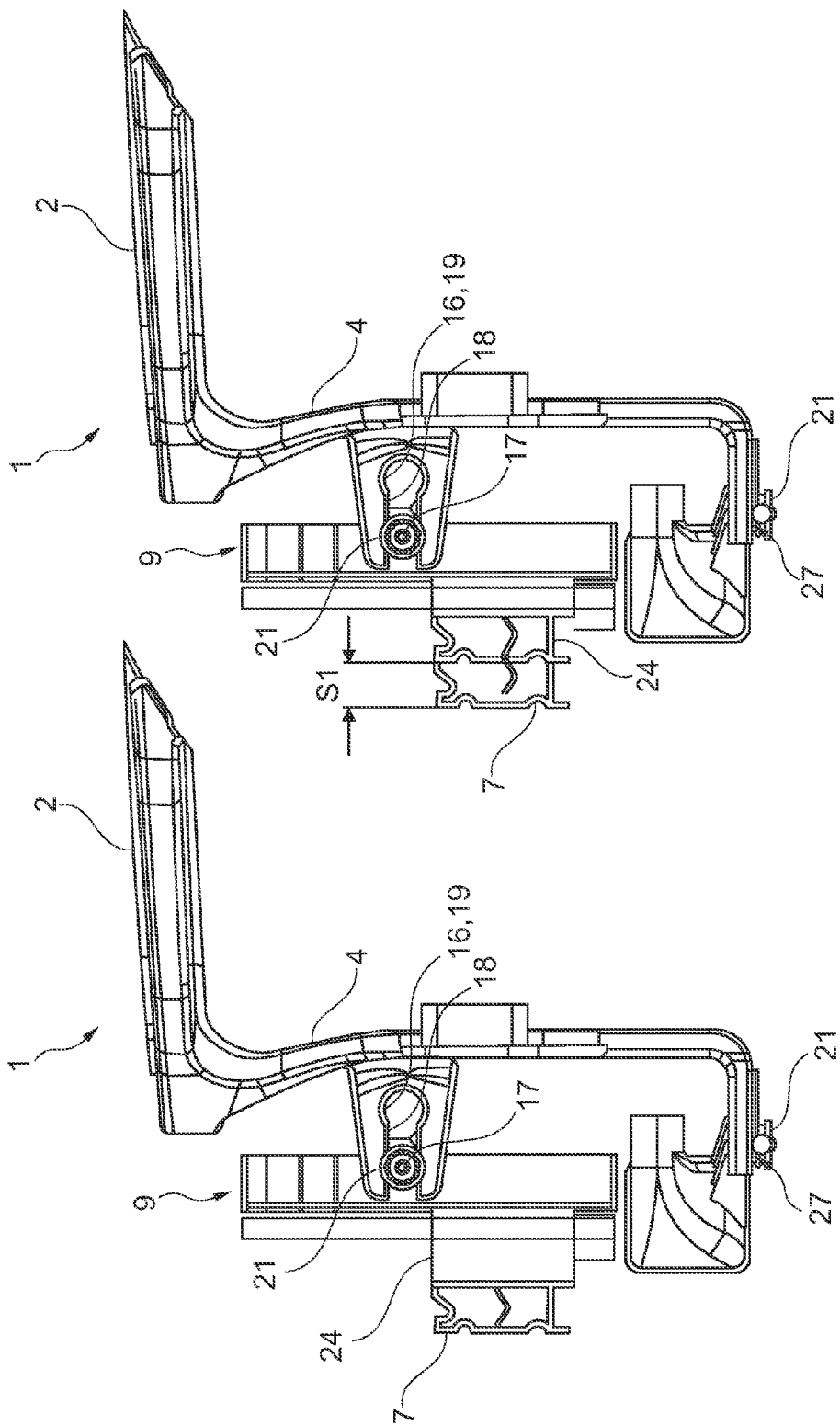

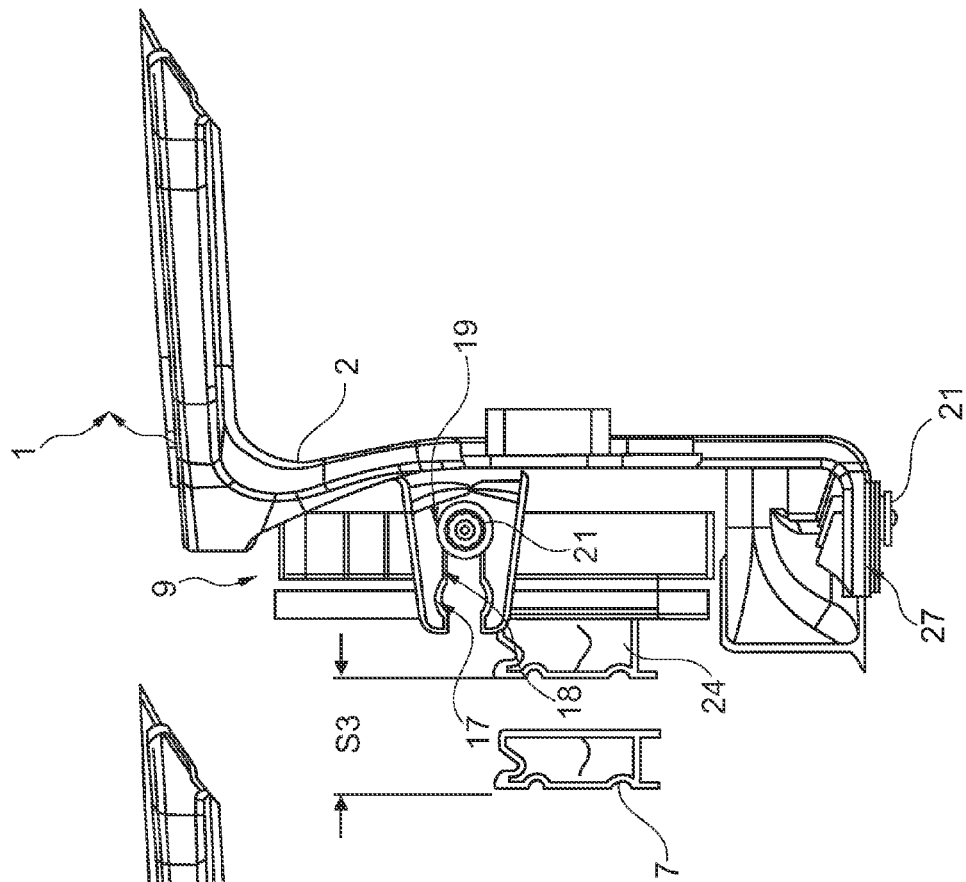
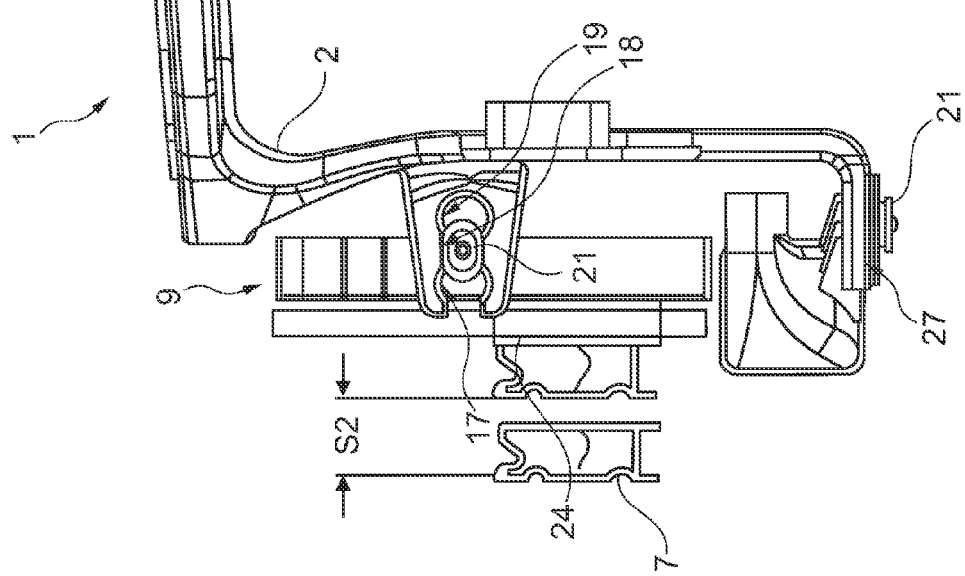

FRONTAL STRUCTURE FOR A MOTOR VEHICLE

CROSS-REFERENCE TO RELATED APPLICATION

This application claims priority to German Patent Application No. 102009058275.4, filed Dec. 14, 2009, which is incorporated herein by reference in its entirety.

TECHNICAL FIELD

The technical field generally relates to vehicle technology and relates, according to its genre, to a frontal structure or a motor vehicle, in which a cooling module is fastened to a support structure by means of a retaining device.

BACKGROUND

Modern motor vehicles are usually provided with self-supporting bodywork, which allows a reduction in weight and costs compared to bodywork constructed on a frame. In the self-supporting bodywork, the components absorb the introduced forces in their entirety, the stiffness of the bodywork being achieved by hollow sheet-metal cross-sections and a compact sheet-metal outer skin. A spatial separation between the passenger compartment and the front vehicle structure is provided by a partition wall disposed transversely to the longitudinal direction of the vehicle. The front vehicle structure usually comprises a front frame, which is used for fastening various vehicle components such as cooling module, engine mounting, battery holder, ABS holder, and the like.

Front frames are built into motor vehicles in manifold ways. For example, in one type of construction implemented by the applicant in automobiles of the "Opel Corsa" type, the front frame comprises two longitudinal members that are connected to one another at their front-side ends by means of a bumper cross member and which are connected to the under floor of the bodywork at the rear by means of downwardly bent extension profiles. This measure provides a crash load path by which forces absorbed by means of the bumper cross member in the event of a frontal collision are introduced into the under floor and side skirt structure. As a result of an additional connection of the longitudinal members to the partition wall, the absorbed forces can also be diverted via the lateral bodywork structure. Merely in addition, it should be noted that a plurality of crash load paths are usually formed in modern motor vehicles.

In almost all motor vehicles, a cooling module around which the wind produced by traveling flows is accommodated behind the bumper cross member on the front vehicle structure. Components of various cooling systems of the motor vehicle are combined in the cooling module in a space-saving manner. Cooling modules can in particular comprise the areas of engine cooling (heat exchanger), intercooling, and air-conditioning system (condenser), wherein suitable coolants are used for this purpose. In addition, a fan driven mechanically via the crankshaft or electrically can be provided, which serves to support the cooling effect of the wind produced by traveling and for cooling the internal combustion engine when stationary. In industrial series production the cooling module is installed as a prefabricated component on the production line.

If, in the event of a frontal collision of the motor vehicle with an obstacle, the bumper cross member is displaced backward in the direction opposite to the direction of travel, the cooling module itself can be severely damaged even at relatively low impact speeds, which requires a cost-intensive repair of the cooling module in the case of rather slight bodywork damage. In addition, if the cooling module is damaged, the vehicle is usually no longer drivable, for example, if coolant has escaped, so that further costs can be incurred for removing the vehicle involved in the accident to a workshop. In addition, the damage caused to a motor vehicle in the case of a collision is an important aspect for the classification into the various insurance classes, which can have the consequence that the motor vehicle is classified relatively unfavorably.

This problem has already been taken up in the patent literature. For example, the German Patent Application DE 102007020914 A1 of the applicant discloses a generic frontal structure for a motor vehicle, in which a frame is provided as a support structure for a radiator, which in the event of a collision-induced backward yielding of the bumper cross member, comes in contact with the bumper cross member earlier than the radiator so that damage to the radiator can be avoided.

In view of the foregoing, it is at least one object to further develop a general frontal structure for a motor vehicle in an advantageous manner. In addition, other objects, desirable features and characteristics will become apparent from the subsequent summary and detailed description, and the appended claims, taken in conjunction with the accompanying drawings and this background.

SUMMARY

According to an embodiment, a frontal structure for a motor vehicle is disclosed. The frontal structure of the genre in question comprises a support structure which can be connected to longitudinal members of a front frame of a bodywork frontal structure. The person skilled in the art is well familiar with the structure and possible configurations of such a front frame, for example, from vehicles of the industrial series production of the applicant so that this need not be discussed in further detail here.

In the frontal structure, a cooling module is fastened on the support structure by means of a retaining device. As usual, components of different cooling systems of the motor vehicle can be combined in the cooling module, where these, as has already been mentioned initially, can be components of the engine cooling and/or intercooling and/or air-conditioning system. In addition, a blower device (fan) can be integrated. In the frontal structure, a bumper cross member is mounted ahead of the cooling module in the direction of travel, the cooling module being disposed, for example, between bumper cross member and internal combustion engine.

The retaining device comprises at least two cooling module holders, which are each attached to a component selected from support structure and cooling module. The two cooling module holders are disposed, for example, at the same height with a relative spacing in the transverse direction of the vehicle. At the same time, the cooling module holders are provided with elongate recesses, in which retaining elements attached to the respectively other component are anchored. The retaining elements can, for example, be configured as retaining stubs or retaining pins. The essential thing in this case is that the retaining device is configured in such a manner that in the event of a backward yielding of the bumper cross member in the case of a frontal collision of the vehicle with an obstacle, an (exclusively) translational displacement of the cooling module in the direction opposite to the direction of travel is rendered possible.

By means of this measure, it can advantageously be achieved that in the event of a frontal collision at a relatively low impact velocity, the cooling module is displaced translationally backward in the direction opposite to the direction of travel as a result of indirect or direct contact with the bumper cross member so that damage to the cooling module can be avoided. As a result, the repair costs are reduced and the vehicle still remains drivable so that no additional towing costs are incurred. In addition, the vehicle can optionally be classified in a more favorable insurance class.

In another embodiment of the frontal structure, the elongate recesses of the cooling module holder extend in the longitudinal direction of the vehicle so that in the event of a backward yielding of the bumper cross member, the cooling module is displaced translationally backward (rearward) in the longitudinal direction of the vehicle.

In a further embodiment, the recesses of the cooling module holder are configured at least partially in the form of indentations which are open on one side, which has the advantage that the cooling module can be mounted in a particularly simple manner by inserting the retaining elements into the indentations.

In a further embodiment, the elongate recesses of the cooling module holder each have a retaining region by which means the retaining element is fixed in its position up to a predetermined force threshold value but which, when the predetermined force threshold value is exceeded, enables a displacement of the retaining element along the recess. By means of this measure, a fixing in the retaining position is created for the cooling module which is only canceled under the action of sufficient force so that it is avoided that the cooling module is unnecessarily displaced from its mounting position even at relatively low impact energy.

In particular, the elongate recesses of the cooling module holder each have a first retaining region, which is connected to a second retaining region by means of a constricted transition region. The first retaining region fixes the retaining element up to a predetermined force threshold value and when the predetermined force threshold value is exceeded, enables a displacement of the retaining element along the recess as far as the second retaining region. The second retaining region prevents a further displacement of the retaining element. By means of this measure, on the one hand, a fixing of the cooling module in the retaining position is provided which only allows a displacement of the cooling module under the action of sufficient force and on the other hand, the displaced cooling module is captured in a defined end position. The cooling module can, for example, be restored into its original mounting position by means of simple displacement of the retaining elements into the first retaining regions. For example, the recesses can each have a rounded first and second retaining section, which are interconnected by a straight transition section.

In a further embodiment of the frontal, the retaining elements consist, at least in sections, of an elastically deformable material which is configured such that a displacement of the retaining element in the elongate recess is made possible by elastic deformation of the retaining element in the event of the predetermined force threshold value being exceeded. In this context, it can be advantageous if the retaining elements are each provided with one or more openings whereby the elastic deformability of the retaining element can be specifically adjusted by means of the number and/or shape thereof. By means of the adjustment of the elastic deformability of the retaining elements, a displacement of the retaining elements into the recesses, which is dependent on the force threshold value, can be achieved reliably and securely in a technically simple manner.

In a further embodiment of the frontal structure, the retaining elements are each fixed in the retaining region by means of a clamping fit, whereby a particularly simple anchoring of the retaining elements in the recesses is made possible.

In a further embodiment of the frontal structure, the retaining device comprises at least one upper pair of cooling module holders and a lower pair of cooling module holders which are disposed in such a manner that they allow a translational displacement of the centre of gravity of the cooling module, in particular along the vehicle longitudinal direction, without tilting of the cooling module, which contributes to avoiding damage to the cooling module in the event of a collision. If, in addition, the upper and/or lower pair of cooling module holders is provided with recesses configured in the form of indentations which are open on one side, the cooling module can be mounted on the support structure in a particularly simple manner by inserting retaining elements in the indentations.

In a further embodiment of the frontal structure, the retaining device is configured in such a manner that it allows a translational displacement of the cooling module parallel to the bumper cross member. This can be achieved by an at least approximately symmetrical introduction of force into the cooling module.

In a further embodiment of the frontal structure, the cooling module holders are each configured as flat lugs, which allow a particularly simple implementation of the retaining device. At the same time, the lugs can each be provided with at least one stiffening edge demarcation, where the strength of the cooling module holder is improved.

In a further advantageous embodiment of the frontal structure, the cooling module is connected to the bumper cross member by means of at least one energy-absorbing first deformation element. The first deformation element is characterized by a lower stiffness (strength) compared with the longitudinal members or greater deformability in particular under the action of force in the longitudinal direction of the vehicle. In the event of a front-side collision of the motor vehicle with an obstacle, said element can be deformed plastically with a lower force than the longitudinal members and is consequently used for the primary absorption of energy in the event of a collision and allows a backward yielding of the bumper cross member without substantial impairment of the cooling module. Preferably, the at least one first deformation element consists, at least in sections, of a compressible foam material which can be compressed up to a certain degree ("block length") where the force can substantially only be transmitted to the cooling module on reaching the block length.

In a further embodiment of the frontal structure, the bumper cross member is connected to the support structure by means of energy-absorbing second deformation elements ("crash boxes"). The second deformation elements are characterized by a lower stiffness compared with the longitudinal members or greater deformability in particular under the action of force in the longitudinal direction of the vehicle. In the event of a front-side collision of the motor vehicle with an obstacle, said elements can be deformed plastically with a lower force than the longitudinal members and are consequently used for the primary absorption of energy in the event of a collision and allow a backward yielding of the bumper cross member without substantial impairment of the cooling module. Preferably, the second deformation elements are each provided, at least in sections, with a truss structure constructed from interconnected wall elements, although it is equally feasible that the second deformation elements have a different suitable structure.

A motor vehicle is also provided in accordance with an embodiment that is fitted with such a frontal structure.

BRIEF DESCRIPTION OF THE DRAWINGS

The present invention will hereinafter be described in conjunction with the following drawing figures, wherein like numerals denote like elements, and:

FIGS. 4A-4D show perspective side views to illustrate the behavior of the frontal structure from FIG. 1 in the event of a frontal collision of the vehicle with an obstacle.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
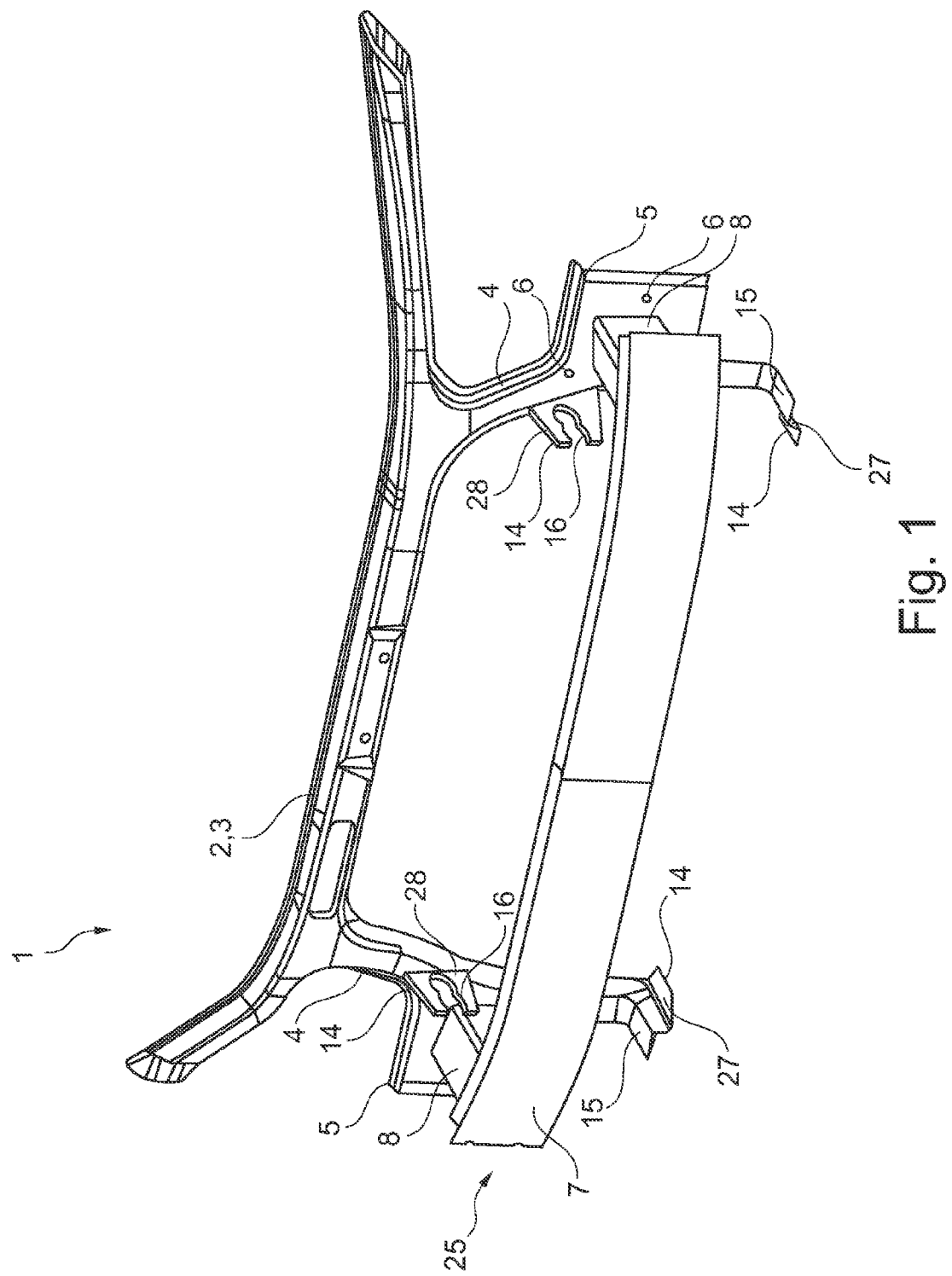
FIG. 1 shows a perspective front view obliquely from above of an embodiment of the frontal structure of a motor vehicle according to the invention without cooling module.
Figure 2:
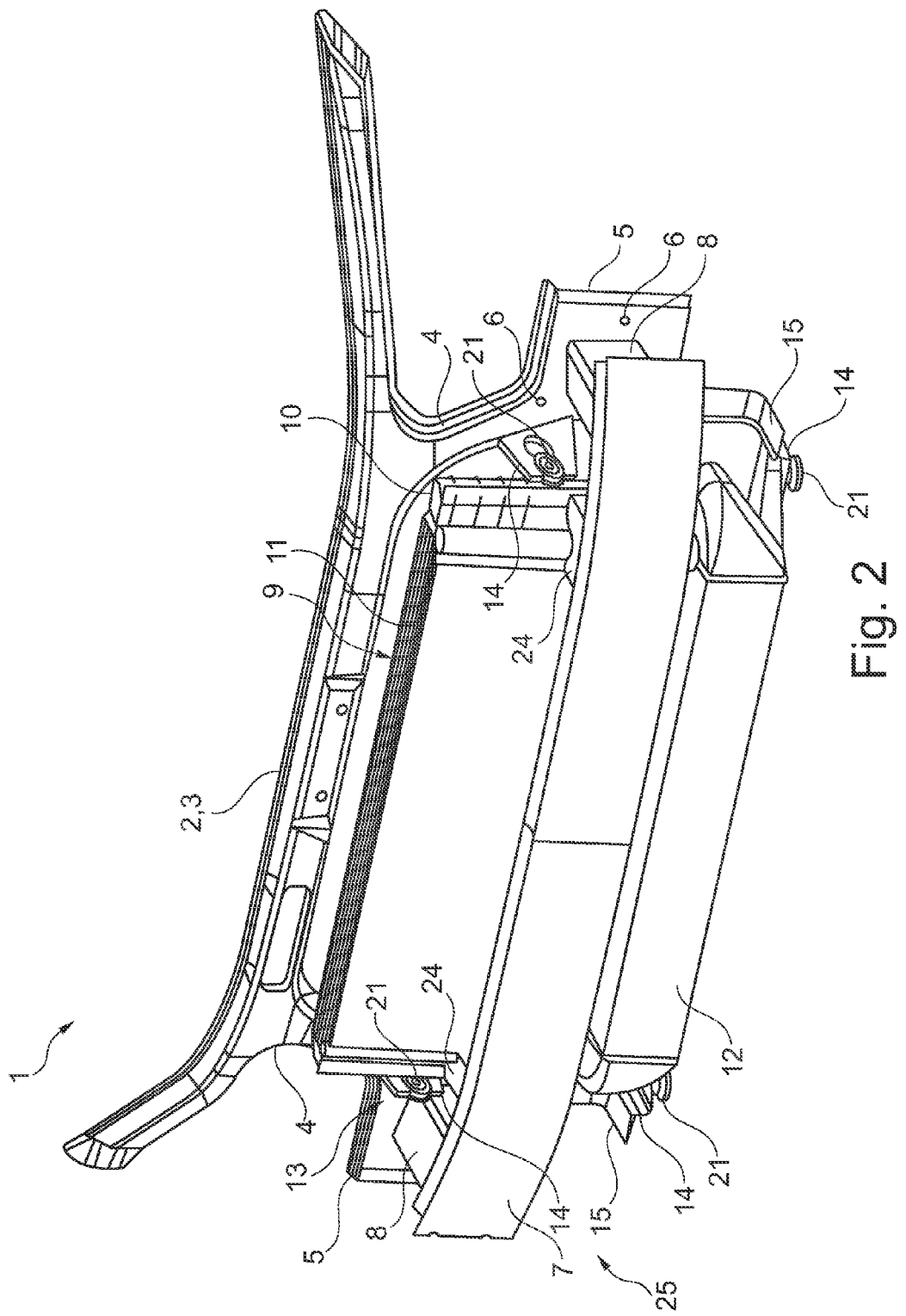
FIG. 2 shows a perspective front view of the frontal structure from FIG. 1 with cooling module.
Figure 3:
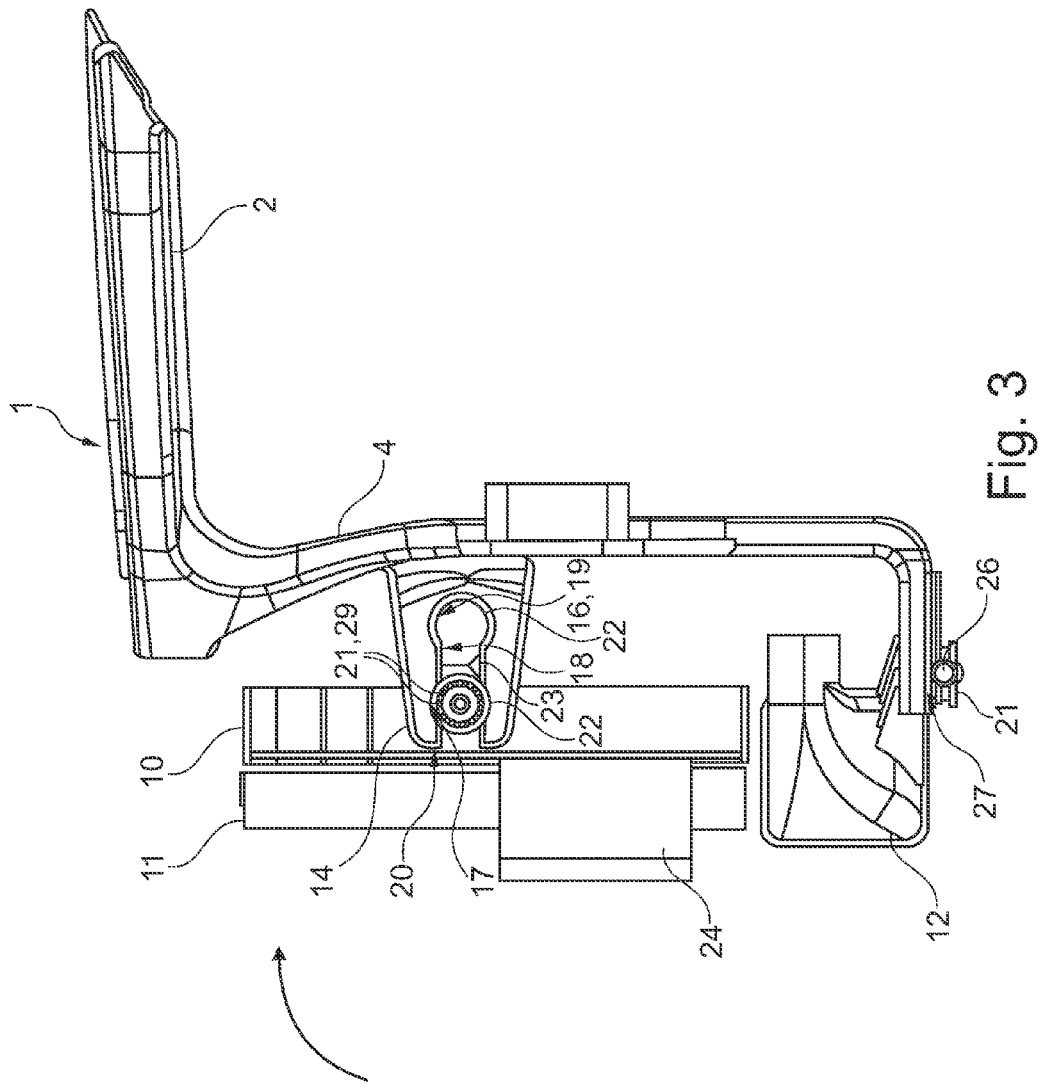
FIG. 3 shows a perspective side view of the frontal structure from FIG. 1 with cooling module.

FIG. 1 gives directional information of a frontal structure designated overall with the reference number 1 relative to the motor vehicle. In conventional notation, "x" corresponds to the longitudinal direction of the vehicle, which is directed here, for example, from the vehicle front to the vehicle rear, "y" denotes the transverse direction of the vehicle, and "z" the vertical direction of the vehicle. The forward direction of travel corresponds to the negative x direction (−x).

The frontal structure 1 is a part of a motor vehicle having self-supporting bodywork. It comprises a supporting structure 2, which can be divided into a plurality of sections. These are a structural cross member 3 disposed transverse to the direction of travel which is connected to lateral wheel fitting struts (not shown). The wheel fitting struts for their part are connected to a partition wall (not shown) which separates front vehicle structure and passenger compartment. Two struts 4 running obliquely downward are molded onto the structural cross member 3, from each of which a flat fastening flange 5 protrudes laterally. The support structure 2 can be fastened to longitudinal members (not shown) of a front frame by means of the fastening flanges 5. For this purpose the fastening flanges 5 are provided with a plurality of holes 6, whereby the support structure 2 can be screwed to connecting plates of the longitudinal members, for example, by means of bolts which pass through the holes 6. However, it is also feasible to fasten the support structure 2 to the longitudinal members by other suitable fastening means.

The fastening flanges 5 serve, on the other hand, as connecting regions for a bumper system 25, which comprises a bumper cross member 7 disposed transversely to the direction of travel, which is fastened to the fastening flanges 5 by means of energy-absorbing deformation elements or crash boxes. The crash boxes 8 are characterized by a lower stiffness or greater deformability compared with the longitudinal members, in particular under the action of force in the longitudinal direction of the vehicle (x). In the event of a front-side collision of the motor vehicle with an obstacle, said crash boxes can be plastically deformed with a lower force than the longitudinal members and consequently serve for the primary absorption of energy in the event of a collision. They consequently allow a yielding backward of the bumper cross member 7 to an appreciable extent without substantially impairing the support structure 2. For this purposes, the crash boxes 8 are provided, for example, with a frame structure constructed of interconnected wall elements, which is easily compressible in the event of a frontal collision, which is not shown in the figures. Equally however, it is also feasible for the crash boxes 8 to have a different suitable structure.

The frontal structure 1 further comprises a module cooling device or cooling module 9, in which components of various cooling systems of the motor vehicle are combined in a space-saving manner. Here, for example, these are a radiator tank 10 through which coolant can flow for engine cooling, a condenser 11 coupled to the air-conditioning system, and an intercooler 12, which serves to enhance the power of the internal combustion engine. Not shown in detail is a blower device or fan, which can be driven mechanically by means of the crankshaft or electrically by the vehicle battery. The cooling module 9 can be installed as a prefabricated component on the production line. Since the precise structure of the cooling module 9 is not necessary for the understanding of the invention and the person skilled in the art is otherwise well familiar with the fundamental structure and the operating mode of such cooling modules, it is superfluous to discuss this in detail here. In the frontal structure 1 the cooling module 9 is disposed between the bumper cross member 7 and the internal combustion engine so that the bumper cross member 7 is mounted ahead of the cooling module 9 in relation to the direction of travel (−x).

The cooling module 9 is fastened to the support structure 2 by means of a retaining device 13. The retaining device 13 comprises two pairs of cooling module holders 14, which are molded onto the support structure 2. Thus, two upper cooling module holders 14 are disposed at approximately the same height with a relative spacing in the vehicle transverse direction (y) and are located approximately in the area of an aligning extension of an upper edge of the bumper cross member 7 at the center of the radiator tank 10. Two lower cooling module holders 14 are molded on frontward bent end sections 15 of the struts 4 in a protruding manner on the inner side and are located approximately in the area of an aligning extension of a lower edge of the intercooler 12.

The cooling module holders 14 are configured as flat, lug-shaped sheet-metal parts and are firmly connected to the support structure 2 likewise fabricated from sheet metal by a conventional connection technique such as welding, riveting, or clinching. Said cooling module holders each extend in the vehicle longitudinal direction (x), wherein the surfaces of the two upper cooling module holders 14 are oriented parallel to the vehicle vertical direction (z) and those of the two lower cooling module holders 14 are oriented parallel to the vehicle transverse direction (y). The two upper cooling module holders 14 are each provided with a recess configured in the form of an elongate indentation 16, which is open on one side, which extends in the vehicle longitudinal direction (x). In contrast to this, the two lower cooling module holders 14 are each provided with a recess configured in the form of an elongate hole 27, which likewise extends in the vehicle longitudinal direction (x). The indentations 16 and the elongate holes 27 merely differ in that the indentations 16 are open at a front-side end 20. The indentations 16 and the elongate holes 27 can each be divided into different regions, i.e., a front-side first retaining region 17, which is connected to a second retaining region 19 by means of a transition section 18. The first retaining regions 17 and the second retaining regions 19 have rounded surfaces 22 while the transition regions 18 between the first and second retaining regions 17, 19 are provided with straight surfaces 23 located opposite one another. In this case, the clear width of the transition regions 18, which is obtained from the relative spacing of the straight surfaces 23, is reduced compared with a diameter of the rounded retaining regions 17, 19. The indentations 16 or elongate holes 27 are consequently each similar to an elongated figure-of-eight, wherein two round holes corresponding to the first and second retaining regions 17, 19 are interconnected by a narrower elongate opening corresponding to the transition region 18. Although this is not shown in the figures, it would equally be feasible that both the two upper cooling module holders 14 and also the two lower cooling module holders are provided with recesses configured in the form of indentations 16 open at the front. In order to increase the stiffness, the cooling module holders 14 are each provided with laterally protruding edge demarcations 28.

For fastening on the support structure 2, the cooling module 9 is provided with four retaining studs 21, wherein an upper pair of retaining studs 21 protrudes laterally from the radiator tank 10 and a lower pair of retaining studs 21 protrudes downward from the intercooler 12. For mounting the cooling module 9, the retaining studs 21 consisting of an elastically deformable material, here for example, rubber ("rubber buffer") are anchored in the first retaining regions 17 of the indentations 16 and elongate holes 27 of the cooling module holder 14. The retaining studs 21 having a cylindrical outer contour are configured for this purpose at least approximately to fit to the first retaining regions 17. In this case, they are dimensioned with a certain excess to the first retaining regions 17 so that they can be anchored in the first retaining regions 17 with a sufficient clamping force (press fit) for the usual driving mode. The second retaining regions 19 are also configured to fit to the retaining studs 21.

The cooling module 9 can be mounted on the support structure 2 in a simple manner. Firstly, the two lower retaining studs 21 are inserted in the first retaining regions 17 of the two lower cooling module holders 14. The cooling module 9 is then tilted about a pivot point 26 predefined by the lower retaining studs 21, wherein the two upper retaining studs 21 are inserted through the open ends 20 of the two upper cooling module holders 14 into the first retaining regions 17. The retaining studs 21 each have a plurality of through openings 29 in the direction of extension, which here for example are hollow-cylindrically shaped. The deformation properties of the retaining studs 21 can be specifically influenced by the number and/or shape of the openings 29. Thus, when there is a larger number and/or a larger clear width of the openings 29, the retaining studs 21 oppose any elastic deformation with lower resistance whereas when there is a smaller number and/or a smaller clear width of the openings 29, said retaining studs oppose any elastic deformation with greater resistance. The cooling module 9 can be mounted in the industrial series production of motor vehicles, for example, during the marriage, which has the advantage that the coolant connections can be made in an ergonomically and readily accessible position.

In the frontal structure 1, two compressible foam parts 24 disposed in the area of the lateral edges of the cooling module 9 are further provided between the bumper cross member 7 and the cooling module 9. These foam parts act as energy-absorbing deformation elements, which are characterized by a lower stiffness or greater deformability compared with the longitudinal members, particularly under the action of force in the vehicle longitudinal direction (x). In the event of a front-side collision of the motor vehicle with an obstacle, these foam parts can be plastically deformed with a lower force than the longitudinal members and are consequently used for the primary absorption of energy in the event of a collision. Within the scope of their compressibility, they allow a backward yielding of the bumper cross member 7 without substantial damage to the cooling module 9. The compressible foam parts 24 can each be compressed as far as a minimal dimension in the vehicle longitudinal direction (x), the so-called block length, so that force can only substantially be transmitted to the cooling module 9 on reaching the block length. The foam parts 24 are attached to the cooling module 9. The foam material can, for example, be based on EPDM (ethylene-propylene-diene rubber), although other suitable materials can also be used.

The behavior of the frontal structure 1 in the event of a frontal collision of the vehicle with an obstacle is now illustrated with reference to FIGS. 4A-4D. FIG. 4A shows a situation before the collision, in which the cooling module 9 is still located in its mounting position. Here the retaining studs 21 are anchored in the first retaining regions 17 of the indentations 16 and elongate holes 27 of the cooling module holder 14. Compared with this, FIG. 4B shows a situation during the collision in which the foam parts 24 are compressed by the backward yielding of the bumper cross member 7. In this case, the bumper cross member 7 can be displaced backward by a distance S1 of, for example, about 25 mm in the vehicle longitudinal direction (x) opposite to the direction of travel until the block length of the foam parts 24 is reached. Consequently, the cooling module 9 remains in a mounting position until the block length is reached. As soon as the block length is reached, force can be transmitted from the bumper cross member 7 to the cooling module 9. During the backward yielding of the bumper cross member 7 the crash boxes 8 are compressed, which is not shown in FIGS. 4A-4D. If, during the further backward yielding of the bumper cross member 7, at least a force corresponding to a predetermined force threshold value is transmitted to the cooling module 9, the elastically deformable retaining studs 21 are pressed into the constrictions of the transition regions 18.

FIG. 4C shows a situation where the retaining studs 21 are located approximately at the center of the transition regions 18. In this case, the cooling module 9 is displaced translationally backward (rearward) in the vehicle longitudinal direction (x). In the situation shown in FIG. 4C, the bumper cross member 7 is displaced backward by a distance S2 of about 50 mm in the direction opposite to the direction of travel. The predetermined force threshold value, on reaching which the retaining studs 21 are pressed from the first retaining regions 17 into the transition regions 18, is obtained from the elastic deformability of the retaining studs 21 and the relative distance between the straight surfaces 23 of the transition regions 18 or its clear width. The smaller this distance and/or the greater the resistance with which the retaining studs 21 oppose any elastic deformation, the greater is this force threshold value. Conversely it holds that the greater is this distance and/or the smaller the resistance with which the retaining studs 21 oppose any elastic deformation, the lower is this force threshold value. The force threshold value can thus be predetermined in a simple manner by the elastic deformability of the retaining studs 21 and/or the dimensioning of the transition regions 18. As has already been stated further above, the elastic deformability of the retaining studs 21 can be specifically influenced by the openings 29.

During further transmission of force to the cooling module 9, the retaining studs 21 ultimately enter into the second retaining regions 19, whereby any further translational displacement of the cooling module 9 in the direction opposite to the direction of travel is prevented. This situation is shown in FIG. 4D. On reaching this end position, the cooling module 9 was displaced backward, for example, by a distance S3 of about 75 mm in the direction opposite to the direction of travel.

The frontal structure 1 therefore provides a possibility for the cooling module 9 to be displaced translationally backward in the direction opposite to the direction of travel under a force acting upon and deforming the bumper system 25 in the vehicle longitudinal direction (x). During incipient deformation of the bumper system 25, initially the foam parts 24 are compressed, where force acting in the direction opposite to the direction of travel is only applied to the cooling module 9 on reaching the maximum compressibility of the foam parts 24. At a predetermined force threshold value which is given by the elastic deformability of the retaining studs 21 and the clear width of the transition regions 18, the retaining studs 21 are pressed from the first retaining regions 17 through the constricted transition regions 18 into the second retaining regions 19, whereby in the exemplary embodiment the cooling module 9 can be displaced backward in the direction opposite to the direction of travel by about 40 to 45 mm. In connection with the compression of the foam parts 24, here for example, about 75 mm of free space can be obtained before any damage occurs to the cooling module 9.

The fastening of the cooling module 9 on the support structure 2 by the retaining device 13 is configured in this case, for example, such that an approximately uniform introduction of force into the retaining device 13 or cooling module holder 14 is accomplished, so that the displacement of the cooling module 9 takes place approximately parallel to the bumper system 25. The vehicle thus remains still drivable, for example, in the event of an impact against a stationary object at up to about 18 km/h. After such a slight collision, the cooling module 9 can easily be pushed back, for example manually, into its original mounting position.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A frontal structure for a motor vehicle, comprising:
a support structure adapted for connection to longitudinal members of a front frame;
a cooling module having at least two elastically deformable retaining studs;
a bumper cross member adapted for mounting to the support structure ahead of the cooling module; and
a retaining device adapted to fasten the cooling module to the support structure, the retaining device comprising:
at least two cooling module holders attached to the support structure and which are provided with elongate recesses to receive the at least two elastically deformable retaining studs,
wherein the retaining device is configured to provide a translational displacement of the cooling module in a backward direction in event of a backward yielding of the bumper cross member.

2. The frontal structure according to claim 1, wherein the elongate recesses extend substantially in a longitudinal direction of the motor vehicle.

3. The frontal structure according to claim 1, wherein the elongate recesses are configured at least partially in a form of indentations open on a side.

4. The frontal structure according to claim 1, wherein the elongate recesses each have a retaining region that substantially fixes the at least two elastically deformable retaining studs in the retaining region up to a predetermined force threshold value and when the predetermined force threshold value is exceeded enables a displacement of the at least two elastically deformable retaining studs along the elongate recesses.

5. The frontal structure according to claim 1,
wherein the elongate recesses each have a first retaining region connected to a second retaining region by a constricted transition region,
wherein the first retaining region substantially fixes the at least two elastically deformable retaining studs in the first retaining region up to a predetermined force threshold value and when the predetermined force threshold value is exceeded enables a displacement of the at least two elastically deformable retaining studs along the elongate recesses as far as the second retaining region, and
wherein the second retaining region substantially inhibits a further displacement of the at least two elastically deformable retaining studs and thus the cooling module.

6. The frontal structure according to claim 1, wherein the at least two cooling module holders are attached to the support structure in a position approximately in the area of an aligning extension an upper edge of the bumper cross member.

7. The frontal structure according to claim 1, wherein the at least two elastically deformable retaining studs include a plurality of openings for adjustment of deformability.

8. The frontal structure according to claim 4, further comprising a clamping fit adapted to substantially fix the least two elastically deformable retaining studs in the retaining region.

9. The frontal structure according to claim 1, wherein the retaining device is configured for the translational displacement of the cooling module substantially perpendicular to the bumper cross member.

10. The frontal structure according to claim 1, wherein the at least two cooling module holders comprise at least one stiffening edge demarcation.

11. The frontal structure according to claim 1, further comprising an energy-absorbing first deformation element adapted to connect the cooling module to the bumper cross member.

12. The frontal structure according to claim 11, wherein the energy-absorbing first deformation element is at least partially formed of a compressible foam material in at least sections.

13. The frontal structure according to claim 1, further comprising energy-absorbing second deformation elements connecting the bumper cross member to the support structure.

14. A motor vehicle, comprising:
a front frame comprising longitudinal members;
a support structure adapted for connection to the longitudinal members of the front frame;
a cooling module having at least two elastically deformable retaining studs;

a bumper cross member adapted for mounting to the support structure ahead of the cooling module; and a retaining device adapted to fasten the cooling module to the support structure, the retaining device comprising:

at least two cooling module holders attached to the support structure and the cooling module and which are provided with elongate recesses to receive the at least two elastically deformable retaining studs, wherein the retaining device is configured to provide a translational displacement of the cooling module in a backward direction in event of a backward yielding of the bumper cross member.

15. The motor vehicle according to claim 14, wherein the elongate recesses extend substantially in a longitudinal direction of the motor vehicle.

16. The motor vehicle according to claim 14, wherein the elongate recesses are configured at least partially in a form of indentations open on a side.

17. The motor vehicle according to claim 14, wherein the elongate recesses each have a retaining region that substantially fixes the at least two elastically deformable retaining studs in the retaining region up to a predetermined force threshold value and when the predetermined force threshold value is exceeded enables a displacement of the at least two elastically deformable retaining studs along the elongate recesses.

18. The motor vehicle according to claim 14, wherein the elongate recesses each have a first retaining region connected to a second retaining region by a constricted transition region, wherein the first retaining region substantially fixes the at least two elastically deformable retaining studs in the first retaining region up to a predetermined force threshold value and when the predetermined force threshold value is exceeded enables a displacement of the at least two elastically deformable retaining studs along the elongate recesses as far as the second retaining region, and wherein the second retaining region substantially inhibits a further displacement of the at least two elastically deformable retaining studs.

19. The motor vehicle according to claim 18, wherein the at least two elastically deformable retaining studs include a plurality of openings for adjustment of deformability.

20. A motor vehicle, comprising:

a front frame comprising longitudinal members;

a support structure adapted for connection to the longitudinal members of the front frame;

a cooling module having a pair of upper elastically deformable retaining studs and a pair of lower elastically deformable retaining studs;

a bumper cross member adapted for mounting to the support structure ahead of the cooling module; and a retaining device adapted to fasten the cooling module to the support structure, the retaining device comprising:

an upper pair of cooling module holders attached to the support structure which are provided with elongate recesses defining a first retaining region connected to a second retaining region by a constricted transition region, the upper pair of cooling module holders being open on one end to receive the upper pair of elastically deformable retaining studs in the first retaining region, a lower pair of cooling module holders attached to the support structure which are provided with elongate recesses defining a first retaining region connected to a second retaining region by a constricted transition region, the lower pair of cooling module holders configured to receive the lower pair of elastically deformable retaining studs in the first retaining region wherein the retaining device is configured to provide in event of a backward yielding of the bumper cross member a translational displacement of the cooling module from the first retaining region through the constricted transition region to the second retaining region which substantially inhibits a further displacement of the cooling module.

* * * * *